United States Patent
Bundy, Jr. et al.

(10) Patent No.: US 6,820,373 B1
(45) Date of Patent: Nov. 23, 2004

(54) FIRE PROTECTION SYSTEM

(76) Inventors: Walter H. Bundy, Jr., P.O. Box 1542, Mt. Pleasant, SC (US) 29465; Lucas Smith, #31 27$^{th}$ Ave., Isle of Palms, SC (US) 29451

(*) Notice: Subject to any disclaimer, the term of this patent is extended or adjusted under 35 U.S.C. 154(b) by 104 days.

(21) Appl. No.: 10/229,774

(22) Filed: Aug. 28, 2002

Related U.S. Application Data

(63) Continuation-in-part of application No. 09/717,331, filed on Nov. 20, 2000, now Pat. No. 6,453,621.

(51) Int. Cl.$^7$ .............................. E04H 14/00; E04H 9/00
(52) U.S. Cl. ...................... 52/1; 52/3; 52/4; 52/DIG. 12
(58) Field of Search ........................ 52/1, 3, 4, DIG. 12

(56) References Cited

U.S. PATENT DOCUMENTS

| | | | | |
|---|---|---|---|---|
| 1,106,624 A | * | 8/1914 | Cadwallader et al. | 47/22.1 |
| 5,579,794 A | * | 12/1996 | Sporta | 135/88.01 |
| 5,791,090 A | * | 8/1998 | Gitlin et al. | 52/4 |
| 6,453,621 B1 | * | 9/2002 | Bundy et al. | 52/3 |

* cited by examiner

Primary Examiner—Carl D. Friedman
Assistant Examiner—Steve Varner
(74) Attorney, Agent, or Firm—B. Craig Killough

(57) ABSTRACT

A fire protection system that covers and protects a structure from fire and other hazards. The system, which is electronically actuated, comprises primarily poles located on opposite sides of the structure, and a flexible fire retardant cover stored on a reel. Cables attached to the flexible fire retardant cover pull it over the structure, when the system is actuated, to form a protective tent.

7 Claims, 3 Drawing Sheets

FIRE PROTECTION SYSTEM

This application is a continuation-in-part of U.S. application Ser. No. 09/717,331, filed Nov. 20, 2000, now U.S. Pat. No. 6,453,621.

FIELD OF THE INVENTION

This invention relates to the field of fire protection systems for structures, and more particularly, to a remotely activatable system having a flexible covering attached to extendable poles, and cables attached to the covering and running to and over those poles, so that the covering can be pulled over the structure to cover it like a tent.

BACKGROUND OF THE INVENTION

Fire protection for structures is an age old problem. Many fires do not start inside the structure; rather, they are communicated to the structure from adjoining structures or trees that are on fire. One way to prevent flying sparks from these adjacent fires from igniting the structure is to make the structure of fireproof materials or cover the structure with a fireproof covering such as a tent. This covering must be secured to a more stable object, such as a tree or rock, by means of a stake or a weight, or have one or more ends of the covering attached to rope or cable buried in the earth. Fireproof material which is restrained by tie downs can also be used to further protect the structure and any objects within the structure from fire damage.

Other means for protection for structures include fastening rigid sheets of fireproof materials to vulnerable portions of the structure, such as roofs, winds and doors. There are two major problems with either of these approaches to fire protection. First, the coverings are time-consuming to erect, and therefore must be erected well in advance of a fire. Secondly, the owner or manage of the structure in question must be there personally to erect such a system, or he or she must have someone who will be able to personally erect the protection. Thus, it is an object of the present invention to provide a remotely activatable fire protection system for a structure, which can speedily be erected.

SUMMARY OF THE DISCLOSURE

The present invention is an inter-related system made up of a flexible fire retardant covering attached to cables which can be pulled over extendible poles and that can be remotely and activated to form a secure tent like covering over a structure.

DETAILED DESCRIPTION OF THE PREFERRED EMBODIMENT

A flexible fire retardant cover is attached to cables that can be pulled over extendible poles and remotely and activated to form a secure fire retardant tent like covering over a structure. Pneumatically telescoping poles are placed at ends of the structure. The cables, when extended by the poles, pull the flexible fire retardant cover over the structure to form a tent like framework covering the structure. The flexible fabric covering is stored underground on a reel when not in use. In use, the covering is extended along and between the cables, forming a strong and protective tent over the structure. All components are anchored into the ground. A video camera and computer controller monitor and activate computer controlled machinery to position and retract the protection system.

Figure 1:
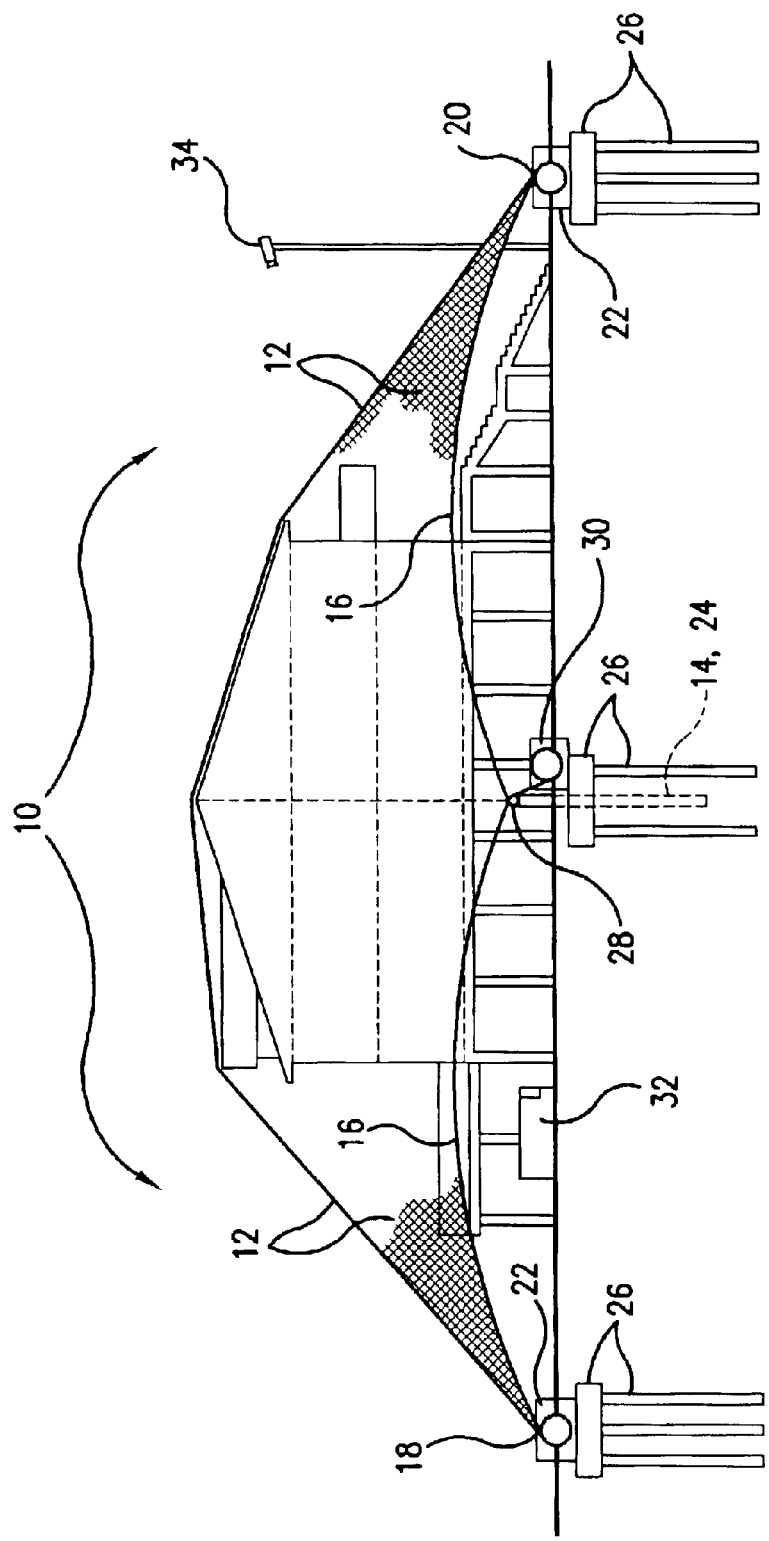
FIG. 1 shows a simplified, side view of the fire protection system of the invention.
Figure 3:
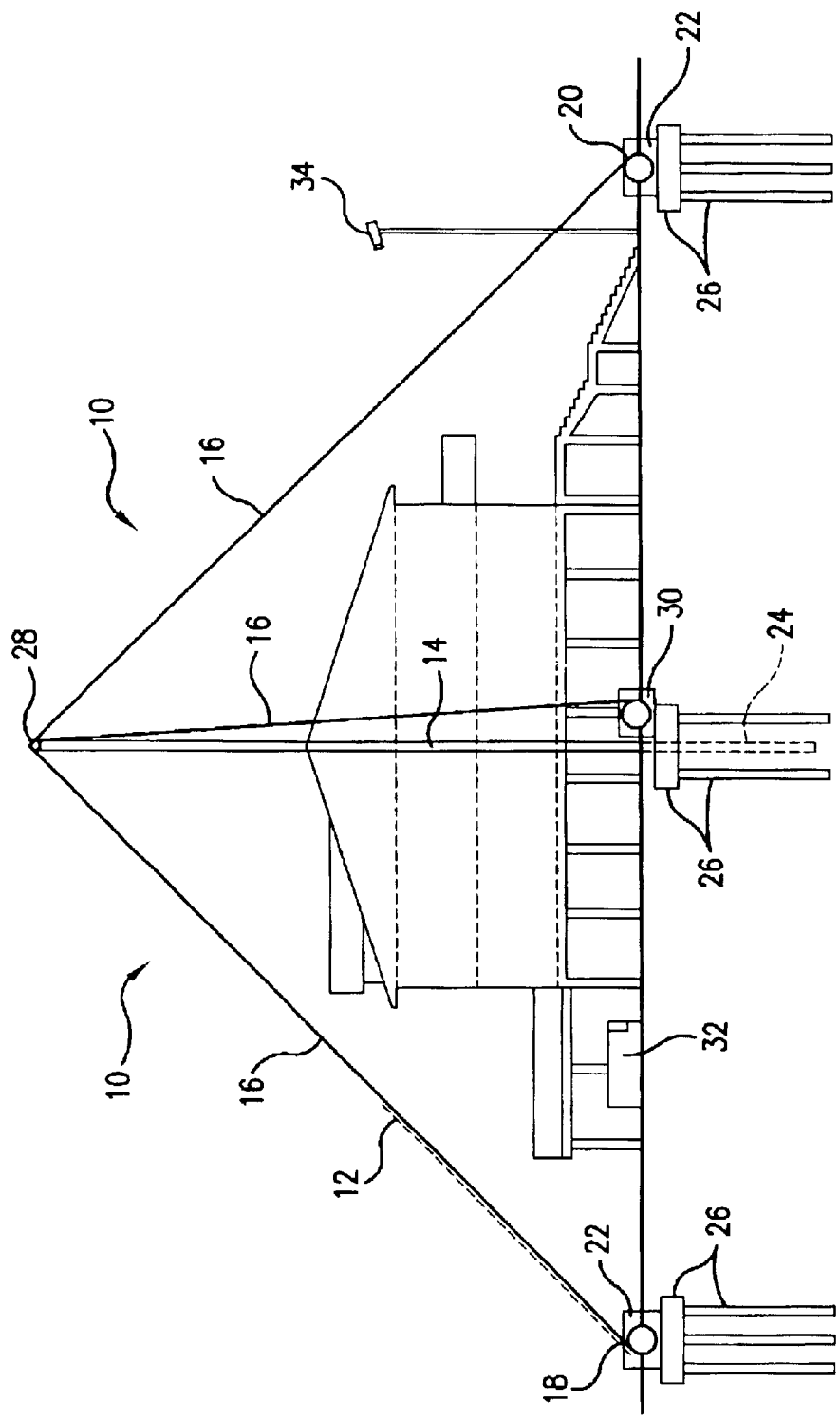
FIG. 3 shows the fire protection system with the support poles in their extended position.

In the drawing figures, like numbers are used to indicate like components. FIGS. 1 and 3 show one side of the structure and the system components. Since the system is, in many respects, mirror imaged, the component and operational descriptions refer to both sides and contained within the stainless steel housing that open at the top when the system is activated.

Figure 2:
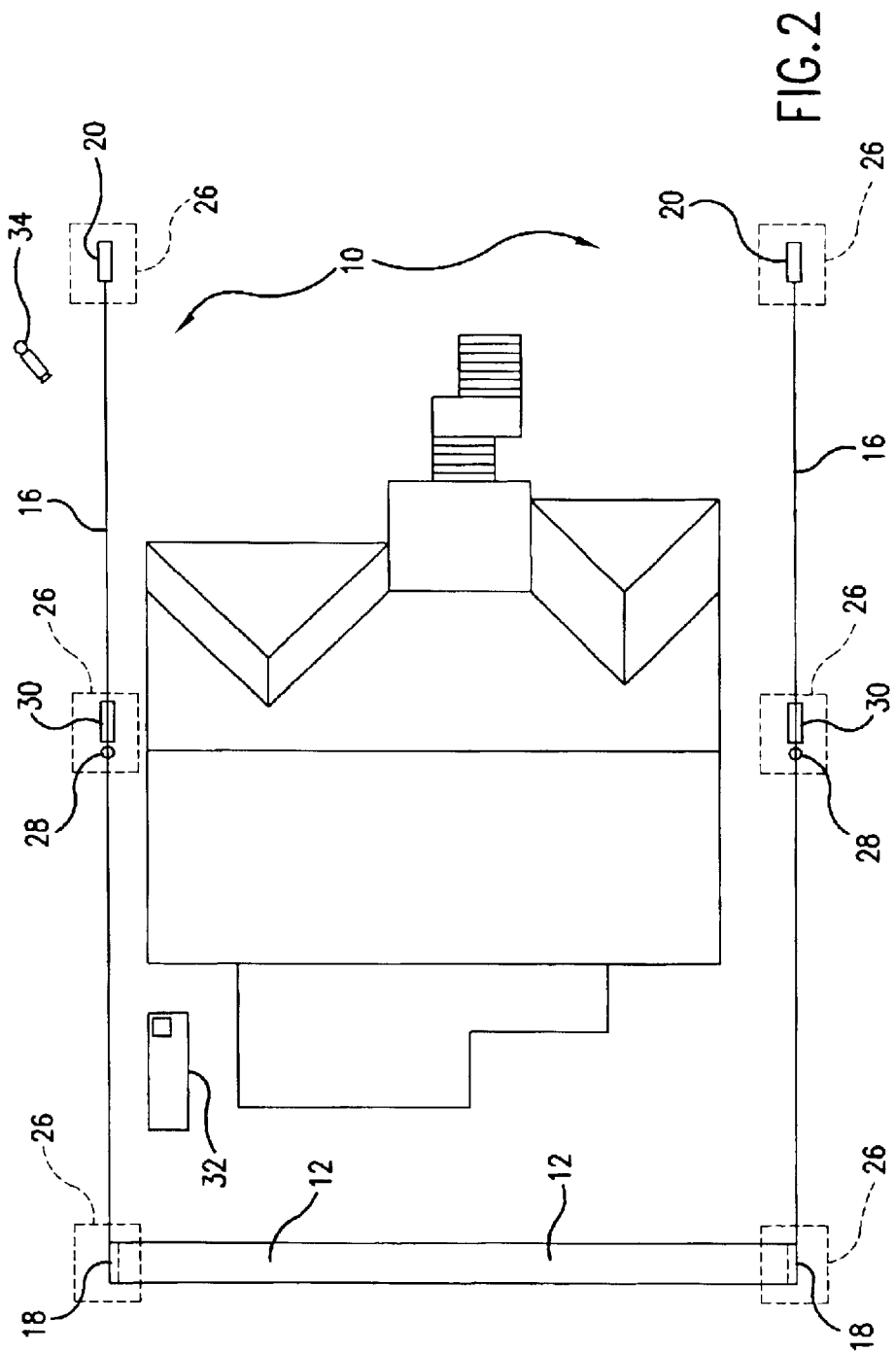
FIG. 2 shows a simplified, top plan view of the system.

FIG. 1 shows fire protection system 10 in the "structure secured" position, after activation. FIG. 2 shows fire protection system 10 after activation but before it has been placed in "structure secured" position.

FIG. 2 shows fire protection system 10 as viewed from above. Some components shown in FIGS. 1 and 3 are not visible in FIG. 2.

As shown in FIG. 1, fire protection system 10 has three major structural components: flexible fire retardant cover 12 (of which, for simplicity, only the two ends are indicated), extendable poles 14, and support cables 16, which are attached to the sides of the flexible fire retardant cover 12, and a flexible covering, the entire system thus reversibly covering a structure, like a tent.

Support cables 16 are attached at one end to cover reel 18 and at the other end to cable reels 20 (as FIG. 2 shows). Support cables 16 are operationally attached to both cover reel 18 and cable reel 20 by winching means. Cover reel 18 and cable reel 20 are located within reel housings 22 which are positioned on opposite ends of the structure and are recessed into the ground.

Support cables 16 are attached at one end to cover reel 18 at one end to cover reel 18 and at the other end to cable reels 20 (as FIG. 2 shows). Support cables 16 are operationally attached to both cover reel 18 and cable reel 20 by winching means. Cover reel 18 and cable reel 20 are located within reel housings 22 which are positioned on opposite ends of the structure and are recessed into the ground.

Extendable poles 14 are also located on opposite sides of the structure (at right angles to the reels, as is shown on FIG. 2). Extendable poles 14 are located within pole housings 24, which allow poles 14 to be partially retracted into the ground. Rotatable pole pulley 2B is located at the end of extendable pole 14. Pole pulley 28 is operated by pulley winch 30. All housings are anchored into the ground with concrete cap and pilings 26.

Each support cable 16 is attached to flexible fire retardant cover 12. The flexible fire retardant cover 12 is, for storage, rolled on to and upon activation, released from, cover reel 18 and contained within the stainless steel housing. Cables 14 are attached along the sides of flexible fire retardant cover 12.

The system is activated either directly (computer controller 32 is activated) or remotely. Remote activation is made possible by observations of the structure which are transmitted to an offsite viewer via digital camera over the Internet, each location will have its own website for continuous observation. When that viewer observes an endangering fire, particularly one driven by wind, computer controller is activated via telephone modem 32. Automatic activation is also possible if a smoke or heat detector (thermostat) connected to computer controller 32 and the system is activated.

Once the system is activated, extendable poles 14 telescopes upwards to height just above the highest point of the structure and simultaneously, cables 16 are drawn up from their pre-activation (and after de-activation) resting locations along the sides of the structure. As poles 14 are being extended they pull cables 16 up with them. When poles 14 are fully extended (as shown in FIG. 3), cable winches 30 activate and pull cables 16 over rotatable pole pulley 28 and down toward cable reels 20. This pulls the flexible fire retardant cover 12 from its stored and rolled position on the cover reel 18 located in the stainless steel housing up over pole pulley 28 and down toward cable reels 20. When the cover is fully advanced toward cable reels 20, the winch activates and tightens cable 16 that is attached to the winch. This tightening forces extendable, and now extended, poles 14 to retract. The flexible fire retardant cover 12 is thus pulled down and around the structure, as shown in FIG. 1. The system is now in its "locked down" configuration.

The flexible fire retardant cover 12 is formed of a fire resistant fabric or textile. This cover may be formed, for example, of fiber glass fibers, KEVLAR® (aromatic polyamide) or fire retardant polymers. One skilled in the art will recognize other fire retardant materials that are suitable for forming the cover.

When the fire or other hazardous condition has abated, the system is unlocked by reversing the activation sequence.

Other modifications to or adaptations of the fire protection system will become apparent to those skilled in the art from an examination of the above patent specifications and drawings. The device is also effective in protecting the structure from wind, hail and other meteorological and environmental hazards. Therefore, other variations of the present invention may be made which fall within the scope of the following claims, even though such variations were not specifically discussed above.

What is claimed is:

1. A fire protection system for a structure comprising:
   a flexible fire retardant cover of sufficient length and breadth to cover a structure to be protected;
   a cover reel located on one side of the structure, the cover reel being of sufficient size that the flexible fire retardant cover may be rolled and stored upon the cover reel;
   a housing in which said flexible fire retardant cover is stored to protect the flexible fire retardant cover when not in use;
   at least one cable reel located on an opposite side of the structure from the cover reel;
   a pair of cables, each of said cables positioned on an opposite side of the structure, and each of said cables communicating at one end with said at least one cable reel and at the other end with said flexible fire retardant cover that is present on the cover reel;
   at least two extendable poles, with each of said at least two extendable poles located at opposite sides of the structure, wherein said at least two extendable poles are extendable above the structure, and wherein one said pair of cables is pulled across one of said at least two extendable poles and wherein a remaining cable of said pair of cables is pulled across a remaining pole of said at least two extendable poles, wherein said pair of cables are transported above said structure and said cover is transported by said pair of cables to cover said structure.

2. A fire protection system according to claim 1, further comprising at least one motor that communicates with said at least two extendable poles and which causes the at least two extendable poles to be extended from a collapsed configuration to an extended position, wherein the at least two extendable poles extend above the structure, said at least one motor further being capable of retracting said at least two extendable poles.

3. A fire protection system according to claim 2, further comprising an additional motor that causes the flexible fire retardant cover to be released from its storage location upon the cover reel when said at least two extendible poles are extended so that said flexible fire retardant cover is drawn over said at least two extendable poles and over the top of the structure and toward the at least one cable reel.

4. A fire protection system for a structure comprising:
   a flexible fire retardant cover of sufficient length and breadth to cover a structure to be protected,
   a cover reel located on one side of the structure, the cover reel being of sufficient size that the flexible fire retardant cover may be rolled and stored upon the reel;
   a cable reel located on an opposite side of the structure from the cover reel,
   a pair of cover cables, each of said cover cables positioned on an opposite side of the structure, and each of said cover cables communicating at one end with said cable reel and at the other end with said flexible fire retardant cover on the cover reel,
   at least two extendable poles, with each of said at least two extendable poles located at opposite sides of the structure, wherein said at least two extendable poles are extendable above the structure, and wherein one said pair of cables is pulled across one of said at least two extendable poles and wherein a remaining cable of said pair of cables is pulled across a remaining pole of said at least two extendable poles, wherein said pair of cables are transported above said structure and said cover is transported by said pair of cables to cover said structure;
   means for causing said at least two extendable poles to be extended from a collapsed configuration, said means for causing said at least two extendable poles to be extended from a collapsed configuration further being capable of retracting said at least two extendable poles, and
   means for causing the flexible fire retardant cover to be released from its storage location upon the cover reel and causing said flexible fire retardant cover to be drawn over the at least two extendable poles and over the top of the structure and toward the cable reel.

5. A fire protection system according to claim 3, wherein the at least one motor for extending and retracting the at least two extendable poles and the additional motor for releasing the flexible fire retardant cover from the cover reel and drawing said flexible fire retardant cover over the structure and toward the cable reel are each remotely activatable.

6. A fire protection system according to claim 4 wherein the means for extending and retracting the at least two extendable poles and the means for releasing the flexible fire retardant cover from the cover reel and drawing said cover over the structure and toward the cable reel are all remotely activatable.

7. A fire protection system according to claim 1 wherein the cable reel, the cover reel, the at least two extendable poles and the at least two cover cables are each located below ground and within recesses adjoining the structure. As shown in FIG. 1, fire protection system 10 has three major structural components: flexible fire retardant cover 12 (of which, for simplicity, only the two ends are indicated), extendable poles 14, and support cables 16, which are attached to the sides of the flexible fire retardant cover 12, and a flexible covering, the entire system thus reversibly covering a structure, like a tent.

* * * * *